United States Patent [19]
Vovan

[11] Patent Number: 6,120,279
[45] Date of Patent: Sep. 19, 2000

[54] MOLD INSERT POSITIONING SYSTEM

[75] Inventor: Terry Vovan, Rialto, Calif.

[73] Assignee: ITT Manufacturing Enterprises, Inc., Wilmington, Del.

[21] Appl. No.: 09/120,623

[22] Filed: Jul. 22, 1998

[51] Int. Cl.[7] .................................................. B29C 33/20
[52] U.S. Cl. ...................................... 425/190; 425/192 R
[58] Field of Search ................................ 425/192 R, 190, 425/188, 182, 595, 186

[56] References Cited

U.S. PATENT DOCUMENTS

| | | |
|---|---|---|
| 3,871,611 | 3/1975 | Taketa . |
| 4,158,910 | 6/1979 | Hanas et al. . |
| 4,288,902 | 9/1981 | Franz . |
| 4,472,128 | 9/1984 | Ruhl . |
| 4,473,346 | 9/1984 | Hehl . |
| 4,525,131 | 6/1985 | Hauser, Jr. . |
| 4,684,101 | 8/1987 | Wagner et al. . |
| 4,714,421 | 12/1987 | D'Agostino . |
| 4,828,479 | 5/1989 | Pleasant . |
| 5,256,056 | 10/1993 | Brown et al. ........................... 425/595 |
| 5,284,432 | 2/1994 | Wurzer . |
| 5,288,222 | 2/1994 | Wieser ................................ 425/192 R |
| 5,358,396 | 10/1994 | Antonius Giesen . |
| 5,387,096 | 2/1995 | Wieser . |

*Primary Examiner*—David A. Simmons
*Assistant Examiner*—Robert A. Hopkins
*Attorney, Agent, or Firm*—Thomas L. Peterson

[57] ABSTRACT

A mold insert (12) is held down in a mold base (16), released, and then ejected upwardly, by positioners (30, 32) that each includes a lock member (50) and an eject member (52). The mold insert has a recess (40) in each side along its front portion and has a largely downwardly-facing shoulder (42) at each side along the rearward portion thereof. Two largely cylindrical bores (44, 46) are formed in the mold base and each communicates with the recess and shoulder at each side of the mold insert. When the lock member is pivoted about the bore axis (54,56), a lock part (74) is moved out of the recess in the mold insert to allow the mold insert to move up out of the mold base. When the ejector member is pivoted about the bore axis, a radially-projecting ejector part (80) moves upwardly against the shoulder on the mold insert to push up the mold insert so its upper end lies above the mold base and can be lifted out.

13 Claims, 4 Drawing Sheets

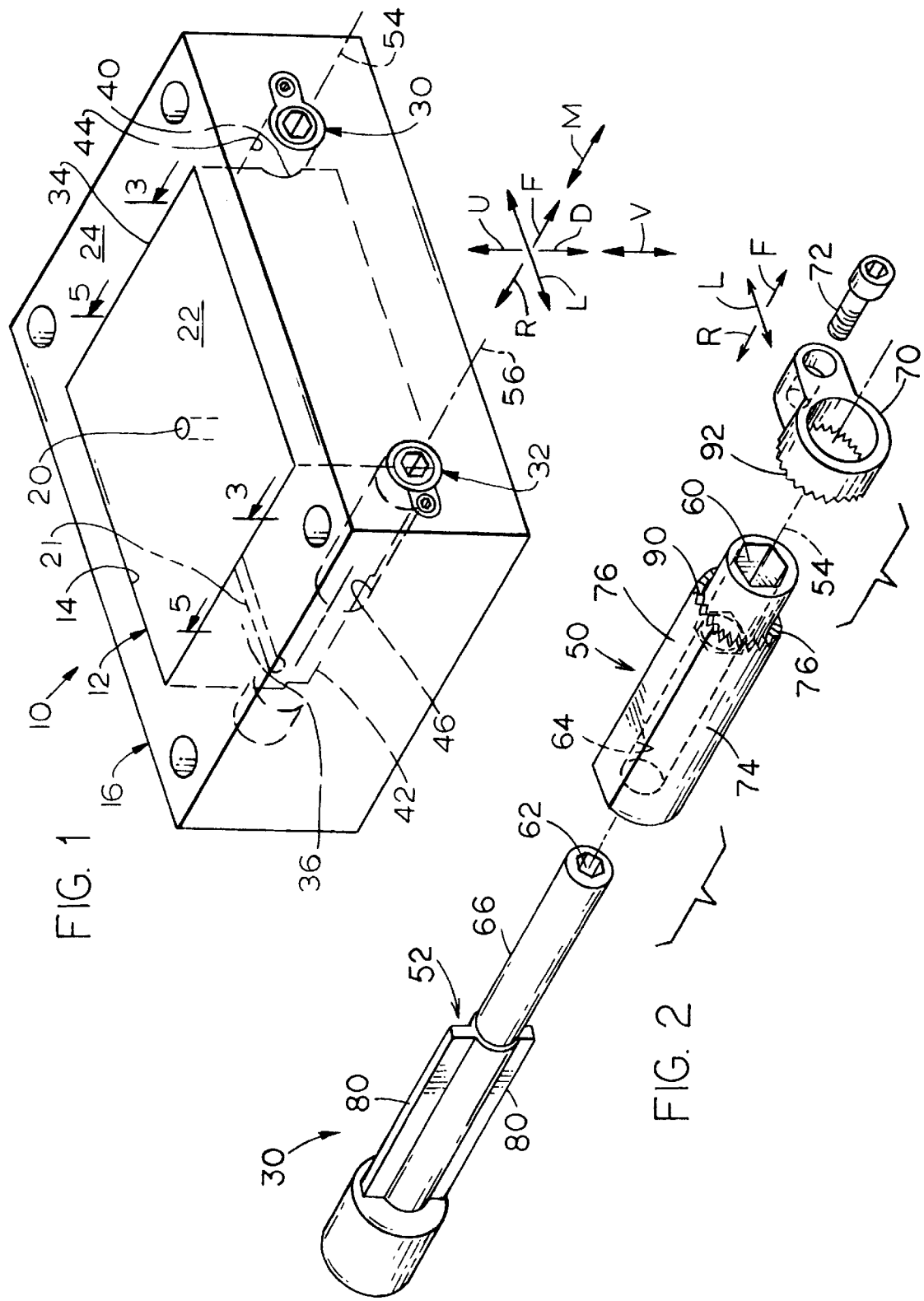

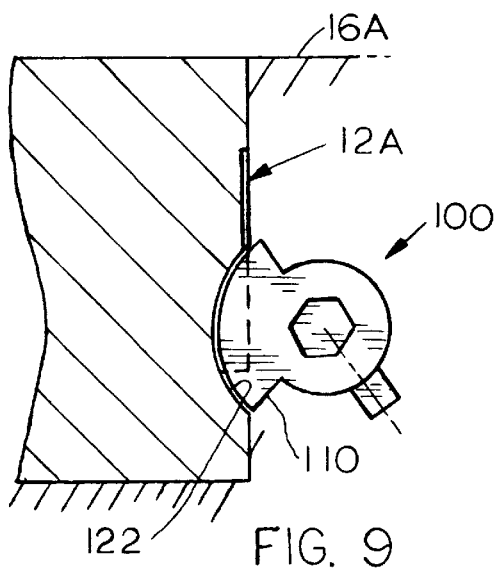
FIG. 9
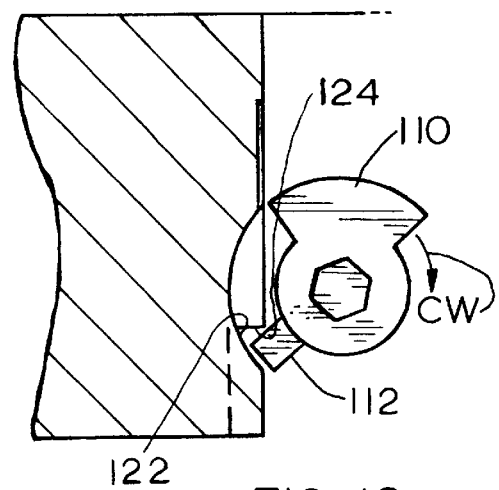
FIG. 10
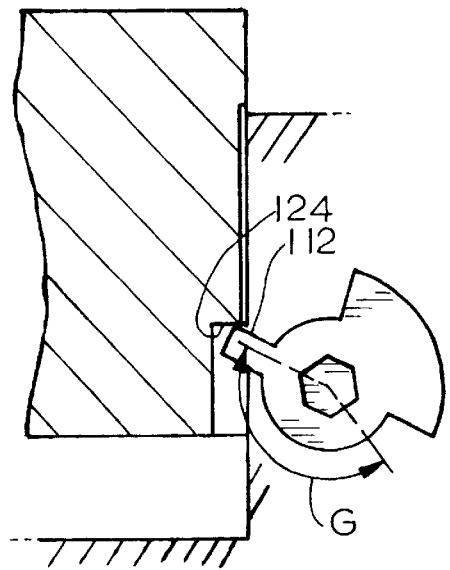
FIG. 11
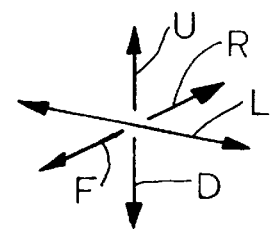
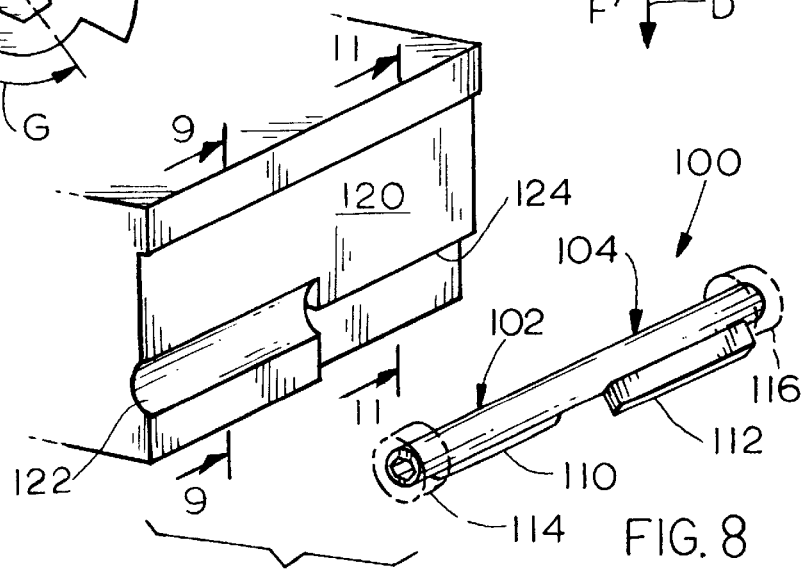
FIG. 8

MOLD INSERT POSITIONING SYSTEM

BACKGROUND OF THE INVENTION

Injection molding is commonly accomplished by constructing a mold insert with cavities and with a sprue hole in its upper surface, and lowering the mold insert into a mold base until the upper surfaces of the insert and base are flush. Then, an injector is pressed down against the upper face of the mold insert and pressured molten plastic is flowed through the sprue hole or a runner into the mold insert. The mold insert is then lifted partially out of the cavity, so it can be opened to remove the molded parts, replace the insert, or perform maintenance.

Prior systems for holding down the mold insert in the cavity, and then releasing the mold insert and lifting it by a plurality of millimeters, had generally included screws, which require some time to screw into place and unscrew to release and lift the mold insert. A system which enabled more rapid locking and ejection of the mold insert would be of value.

SUMMARY OF THE INVENTION

In accordance with one embodiment of the present invention, apparatus is provided for positioning a mold insert with respect to a mold base, which enables rapid locking of the mold insert in its downward position, and which enables release of the mold insert and positive lifting of the mold insert in a simple and rapidly-achieved manner. The mold insert has opposite sides that open to horizontal bores in the mold base, with each side having a recess and having a largely downwardly facing shoulder. A lock member pivotally mounted within each bore, has a projecting lock part that can be turned to enter a recess to hold down the mold insert, and that can be later turned to move the lock part out of the recess to enable the mold insert to be removed. An ejector member lying in each bore, has an ejector part. When an ejector member is turned, the ejector part pushes up against the shoulder to lift the mold insert. A lock member and ejector member preferably lie in each bore, one behind the other.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a mold assembly, with the mold insert fully inserted and locked in place in the mold base.

FIG. 2 is an exploded isometric view of a positioner of the mold assembly of FIG. 1.

FIG. 8 is an exploded partial isometric view of a mold insert and of a positioner constructed in accordance with another embodiment of the invention.

FIG. 9 is a sectional view taken on line 9—9 of FIG. 8, with the lock member in a lock position.

FIG. 10 is a view taken on line 10—10 of FIG. 8, with the eject member shown in a noneject position.

FIG. 11 is a view similar to that of FIG. 10, but with the ejector in an eject position.

DESCRIPTION OF THE PREFERRED EMBODIMENTS

Figure 3:
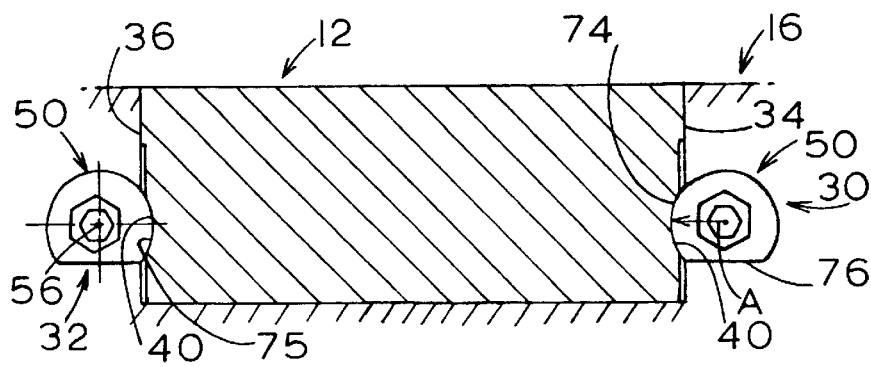
FIG. 3 is a partial sectional view taken on line 3—3 of FIG. 1, and showing each lock member in a lock position.

FIG. 1 illustrates a mold assembly 10 which includes a mold insert 12 that lies in a cavity 14 of a mold base 16. The mold insert has a sprue hole 20 and/or a runner 21 that leads to mold cavities, and molten plastic is injected through the sprue hole to mold parts. It is noted that the mold assembly may be used to cast metal parts. The mold insert 12 must be held down within the cavity, with its upper face 22 flush with the upper face 24 of the mold base. After plastic is injected, the mold insert is released to move up, and is then pushed up by a plurality of millimeters so it can be grasped and pulled out of the cavity or only an upper part lifted off. A pair of positioners 30, 32 serve to lock down the mold insert within the mold base, and to later release the insert and then forcefully push it up by a plurality of millimeters.

The mold insert and mold base have dimensions in forward and rearward directions F, R, which are both longitudinal M, have dimensions in lateral directions L, and have dimensions in up and down directions U, D, which are vertical V. These dimensions are used hereafter to help in describing the invention as illustrated.

The mold insert 12 has laterally opposite sides 34, 36. Each side has a recess 40 along a front portion, and has a largely downwardly-facing shoulder 42 along a rear portion. The recess and shoulder at each side opens to a longitudinal bore 44, 46 that is formed in the mold base, with each positioner 30, 32 being pivotally mounted within a corresponding bore.

FIG. 2 illustrates one of the positioners 30 that lies in a bore 44 of the mold base. The positioner includes a lock or lock member 50 and an ejector or eject member 52. In this embodiment of the invention, the lock member and eject member are not fixed together, although they both can pivot about an axis 54 which is concentric with the axis of the corresponding bore. Because the two members are separately pivotable, the lock member has a wrench-receiving lock socket 60 while the eject member has an ejector socket 62. The lock member has a through passage 64 extending along its axis, and the eject member has an extension 66 that projects partially through the passage 64, so that both sockets 60, 62 are accessible from the front of the mold base. A retention sleeve 70 is used to prevent the lock and eject members from moving forwardly out of the bore. The retention sleeve 70 is fixed to the mold base by a screw 72.

FIG. 3 is a view taken on line 3—3 of FIG. 1, showing how the mold insert 12 is held down within the mold base 16. FIG. 3 shows the positioners 30, 32 with their lock members 50 in locked positions. In the locked positions, lock parts 74 which project by a predetermined radially distance A from the axis 54, 56 lie in the corresponding recesses 40 at the lateral opposite sides 34, 36 of the mold insert, to lock the mold insert in its down position. Each recess 40 forms a partially upwardly-facing shoulder 75 that can engage a lock part 74 to prevent upward movement.

Figure 4:
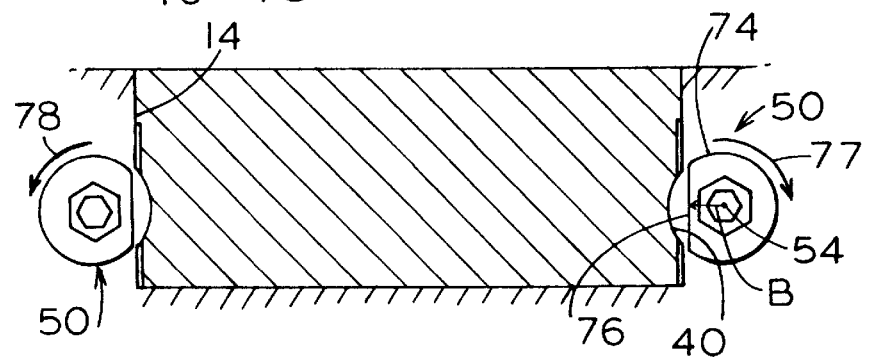
FIG. 4 is a view similar to that of FIG. 3, except that the lock members have been turned to release positions.

FIG. 4 shows the lock members 50 after they have been turned by 90 degrees as indicated by arrows 77, 78, so release parts 76 project towards the insert, but do not lie within the insert. This is because the release parts extend a radial distance B from the corresponding axis such as 54, where the distance B is less than the distance A. The lock part 76 does not lie in the mold insert recess 40. As a result, the mold insert 12 is free to be lifted up out of the cavity 14.

Figure 5:
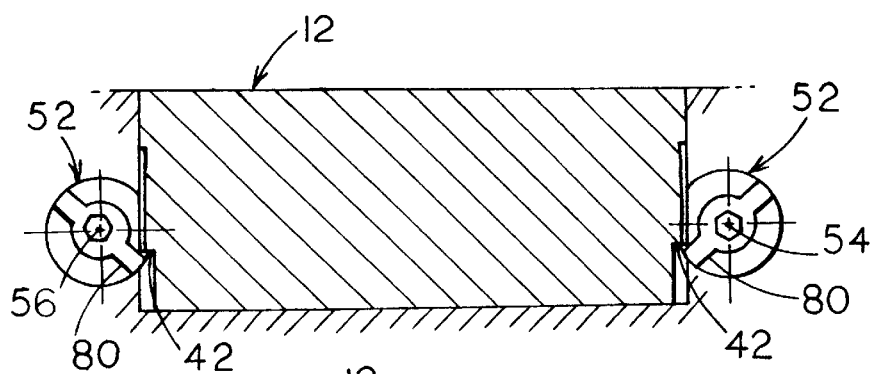
FIG. 5 is a partial sectional view taken on line 5—5 of FIG. 1, with the eject members shown in their noneject positions.

FIG. 5 is a view taken on line 5—5 of FIG. 1, showing the eject members 52 in the their noneject positions. In FIG. 5, ejector parts 80 which project radially from the corresponding axes 54, 56 have not yet pushed up the largely downwardly-facing shoulders 42 of the mold insert 12.

Figure 6:
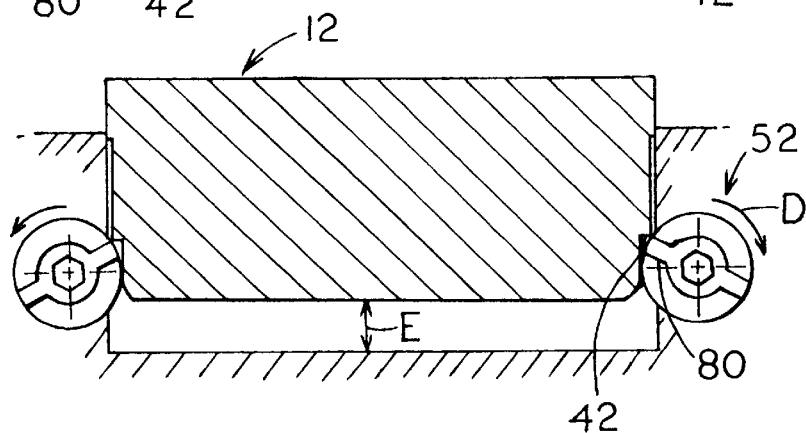
FIG. 6 is a view similar to that of FIG. 5, but with the eject members having been turned to their eject positions.

FIG. 6 shows the eject members 52 after they have been turned by the angle D so their ejector parts 80 have pushed up against the shoulders 40, 42 on the mold insert to lift it by a distance E of a plurality of millimeters. In some case, the mold insert has been lifted sufficiently so a top plate on the mold insert can be removed, the molded parts can be removed, and the top plate can be replaced. In other cases, the mold insert is grasped, as at cut outs 82, to lift the mold insert completely out of the cavity.

Figure 7:
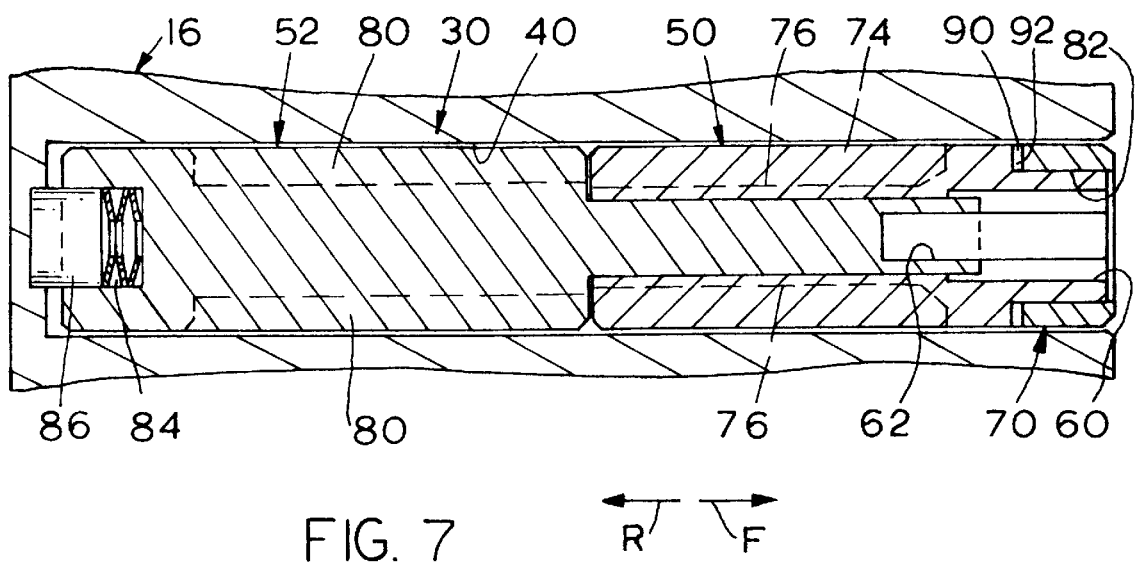
FIG. 7 is a sectional view of the positioner of FIG. 2, shown lying in the mold base.

FIG. 7 shows the positioner 30 installed within the bore 40 of the mold base 16. The lock member 50 is shown, with a pair of lock parts 74 and a pair of release parts 76, while the eject member 52 is shown with a pair of ejector parts 80. It may be noted that only one lock part 74 and only one ejector part 80 is required for each lock member and eject member, respectively, but applicant prefers to provide two lock parts and two ejectors to make mounting simpler. It is noted that the wrench-receiving lock socket 60 for turning the lock member 50, and the wrench-receiving ejector socket 62 for turning the eject member 52, are both accessible from the front end of the positioner. A spring 84, shown formed by a plurality of spring washers, pushes against a stub shaft 86, to urge the eject member 52 and lock member 50 in a forward direction F. The front of the lock member has serrations at 90 which engage corresponding serrations 92 at the rear of the retention sleeve (also see FIG. 2). The serrations make it difficult to turn the lock member 50 unless a socket wrench that has been inserted into the lock socket 60 is pushed rearwardly to compress the spring 84 and move the lock member serrations 50 out of contact with the retention sleeve serrations 92. After such movement, which requires a force such as one pound and rearward movement of the lock member by about 2 mm, the lock member 50 can be readily turned. Applicant prefers to provide means for limiting turning of the lock member such as shoulders at the ends of the serrations 90, 92, to limit turning of the lock member only between the positions shown in FIGS. 3 and 4. It is noted that when the mold insert is moved down into the cavity in the release position shown in FIG. 4, the lock member 50 will be in its release position, and the serrations will keep it there until the lock member is turned 90 degrees to the position shown in FIG. 3.

A single tool can be used that has the larger hexagonal wrench for the lock socket 60 and a smaller hexagonal wrench for the ejector socket 62, or two separate tools can be used, to turn the lock member and separately turn the ejector member.

FIGS. 8–11 illustrate another positioner 100 for locking down and lifting up a mold insert 12A. The positioner includes a lock or lock member 102 and an ejector or ejector member 104 that are fixed together, and that may be formed from an integral piece of steel stock. The positioner includes a lock part 110 and an ejector part 112, and lies in a bore of the mold base. A pair of sleeves indicated at 114, 116 can pivotally support the position within the bore. A side 120 of the mold insert has a recess 122 with a partially upwardly-facing shoulder and has a downwardly-facing shoulder 124.

FIG. 9 shows the positioner in a locked position, wherein the lock part 110 lies in the recess 122 to prevent upward movement of the mold insert 12A out of the mold base 16A. FIG. 10 shows the positioner after it has been turned about 90° clockwise from the position of FIG. 9, so the lock part 110 lies outside of the recess 122, and the mold insert is free to be lifted. It is noted that the ejector part 112 lies closely under the shoulder 124 so further turning of the positioner in the direction CW will lift the mold insert. It is noted that the area under the shoulder 124 is unobstructed. FIG. 11 shows the positioner after it has been turned by the angle G from its initial position in FIG. 9. The ejector part 112 has pushed up against the shoulder 124 to lift the mold insert 12A.

The positioner 100 of FIG. 8 can be modified by providing ejector parts similar to 112 at both the front and rear end of the positioner, and by providing a lock part similar to 110 only at the middle (between the front and rear ends).

Applicant has used terms such as "up" and "down" to describe the invention as it is illustrated. While applicant generally prefers to position the faces 22, 24 of the mold insert and mold base so they face upwardly, it is possible to orient them in other positions.

Thus, the invention provides apparatus for positioning a mold insert within a cavity of a mold base, which enables locking and release of the insert with less than a full turn of a lock, and which allows ejection or lifting of the mold insert by turning of less than a full turn of an ejector. The positioner includes a lock member with a lock part that projects sufficiently radially from the axis of pivoting of the lock member, so the lock part can lie in a recess in a side of the mold insert to prevent upward movement of the mold insert until the lock member is pivoted so the lock part moves out of the recess. The positioner also includes an eject member with a radially projecting ejector part that moves against a largely downwardly-facing shoulder at the side of the mold insert, so when the eject member is turned the ejector part lifts the mold insert. The lock member and eject member can be separately pivotable about the same axis, or can be fixed together (e.g. integrally formed).

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for positioning a mold insert with respect to a mold base, where the mold insert can be moved downward into a cavity in the mold base and can be moved in an upward direction at least partially out of the cavity, and the insert has perpendicular lateral and longitudinal dimensions that are each perpendicular to vertical downward and upward direction, wherein:

said mold insert has laterally opposite sides and has a recess in a first of said sides which forms a shoulder that faces at least partially upward; and said mold base has a longitudinally-extending bore extending alongside said recess in said mold insert; and including a lock member that lies in said bore with said member having a lock axis and being pivotable about its axis between lock and release positions, and with said lock member having circumferentially-spaced lock and release parts, with said lock part projecting into the mold insert recess to lie above said shoulder in the lock position of the lock member, and with said release part lying away from a position above said shoulder when the lock member lies in said release position to then allow said mold insert to be lifted out of said cavity.

2. The apparatus described in claim 1 wherein:

said mold insert has a largely downwardly-facing shoulder; and including an eject member pivotally mounted in said mold base about an eject axis between noneject and eject positions, with said eject member having an ejector part that projects far enough from the eject axis that when the eject member is pivoted in a predetermined direction about its axis from the noneject position, the ejector part moves at least partially upwardly against said mold insert shoulder and pushes it up, to push up the mold insert.

3. The apparatus described in claim 2 wherein:

said eject member lies in said bore, with said lock axis being substantially coincident with said eject axis and with the ejector part being longitudinally spaced from the lock and release parts of the lock member.

4. The apparatus described in claim 3 wherein:

said lock member lies forward of said eject member, with said lock member having a through passage lying on said axis, and with said eject member having an extension extending forwardly through said passage with said extension having a wrench-engaging front end formed to engage a wrench to pivot the eject member.

5. The apparatus describer in claim 1 including:

a retainer lying at a front end of said bore and fixed to said mold base, with said retainer having a retainer hole aligned with said bore, and with said lock member having wrench-engaging means aligned with said retainer hole, to enable said lock member to be pivoted by a wrench projected into said retainer hole.

6. The apparatus described in claim 1 including:

a spring which applies a force to push said lock member forwardly, and a pair of serrations, one on said lock member and one fixed with respect to said mold base, with said serrations positioned to engage each other to resist turning of the lock member unless the lock member is pushed rearwardly against the force of said spring to disengage the pair of serrations.

7. Apparatus for positioning a mold insert with respect to a mold base, where the mold insert can be moved downward into a cavity in the mold base and can be moved upward out of the cavity, and the insert has perpendicular lateral and longitudinal dimensions that are each perpendicular to said downward and upward directions, wherein:

said mold insert has laterally opposite sides and has a largely downwardly-facing shoulder in each of said sides; and said mold base has a pair of longitudinally-extending bores extending alongside said shoulders in said mold insert; and including a pair of eject members each pivotably mounted about an axis in one of said bores between noneject and eject positions, with each eject member having an ejector part that projects far enough from the corresponding axis that when the eject member is pivoted in a predetermined direction about its corresponding axis from the noneject position, the ejector part moves at least partially upwardly against a corresponding mold insert shoulder to push it upward.

8. The apparatus described in claim 7 wherein:

each of said laterally opposite sides of said mold insert has a recess, with each recess and a corresponding shoulder at one side of said mold insert being primarily longitudinally spaced apart along said side of said mold insert; and including a lock member lying in each of said bores with each lock member being pivotable about the corresponding axis between lock and release positions, and with each lock member having a lock part that is longitudinally spaced from the eject member and that lies, in said lock position, in a corresponding one of said recess to prevent movement of said mold insert out of said cavity in said lock position of lock member until said lock member is turned to said release position to move said lock part out of said recess.

9. Apparatus for mounting in a bore of a mold base to control the position of a mold insert that has a recess and a largely downwardly-facing shoulder comprising:

a lock that has a pivot axis and that has a lock part extending radially from said pivot axis sufficiently that when said lock is turned to a lock position said lock part lies in said mold insert recess to lock said mold insert, but when said lock is turned to a release position said lock part moves out of said mold insert recess so said mold insert can be removed at least partially out of said mold base;

an ejector that has an eject axis of pivoting that is coincident with said pivot axis of said lock, with said ejector being pivotable about said pivot axis independently of said lock, said ejector having an ejector part that projects from said axis to push up against said mold insert shoulder when said ejector is pivoted in a predetermined direction about said pivot axis.

10. The apparatus described in claim 9 wherein:

of said lock and said ejector one of them has a through passage lying on said pivot axis and the other has an extension that extends through said passage, with said lock and said ejector having wrench-engaging ends facing in the same direction wherein one of said wrench-engaging ends lies at an end of said extension, and the other of said wrench-engaging ends is formed by an end of said through passage.

11. A method for controlling the position of a mold insert in a cavity of a mold base, comprising:

positioning a pair of lock members in the mold base, on opposite sides of the mold insert, and with each lock member having a lock part lying in an insert member recess;

moving each lock member to withdraw the corresponding lock part from a corresponding recess, to thereby release the mold insert;

positioning a pair of eject members in the mold base on opposite sides of the mold insert, with each eject member having an ejector and with each of said opposite sides of said mold insert having a largely downwardly-facing shoulder;

moving each eject member to move its ejector part largely upwardly against one of said shoulders, to lift the mold insert partially out of the cavity;

said steps of moving each lock member and moving each eject member includes turning each member about a horizontal axis.

12. The method described in claim 11 wherein:

said steps of positioning said lock members and positioning said eject members includes positioning one lock member and one eject member so they each lie along one of said horizontal axes, and said steps of turning include turning each lock member and a corresponding eject member about the same horizontal axis.

13. A mold assembly comprising:

a mold base that has an upper face and a cavity extending down from said upper face;

a mold insert that lies in said cavity, said mold insert having a side with a recess and a largely downwardly-facing shoulder, with said recess and shoulder being spaced along a pivot axis;

a positioner that is pivotally mounted about said pivot axis in said mold base, said positioner having a lock part and an ejector part lying respectively adjacent to said recess and to said shoulder, with said lock part and said ejector part pivoting together about said pivot axis:

said lock part extending radially from said pivot axis sufficiently that when said positioner is turned to a lock position said lock part lies in said mold insert recess to lock said mold insert against movement out of said cavity, but when said positioner is turned in a first direction from said lock position to a release position said lock part moves out of said mold insert recess so said mold insert can be removed at least partially out of said cavity;

said ejector part projects from said axis and is positioned to push up against said mold insert shoulder when said positioner is further pivoted in said first direction about said pivot axis after said positioner has reached said release position.

* * * * *